United States Patent
Huang

[11] Patent Number: 6,116,729
[45] Date of Patent: Sep. 12, 2000

[54] HEAD MAGNIFYING GLASS

[75] Inventor: Tsung-Hui Huang, Tai Pei, Taiwan

[73] Assignee: GEM Optical Co., Ltd., Taichung Hsien, Taiwan

[21] Appl. No.: 09/376,842

[22] Filed: Aug. 18, 1999

[30] Foreign Application Priority Data

Sep. 28, 1998 [CN] China .................................. 98 2 07452

[51] Int. Cl.[7] ........................................................ G02C 1/00
[52] U.S. Cl. ............................................... 351/41; 351/158
[58] Field of Search ................................ 351/41, 158, 57; 2/452, 453

[56] References Cited

U.S. PATENT DOCUMENTS

| | | | |
|---|---|---|---|
| 1,741,264 | 12/1929 | Wappler | 351/158 |
| 3,945,712 | 3/1976 | Crock et al. | 351/41 |
| 5,715,030 | 2/1998 | Quaresima | 351/158 |
| 5,767,932 | 6/1998 | Gordon | 351/158 |

*Primary Examiner*—Huy Mai
*Attorney, Agent, or Firm*—J. C. Patents; Jiawei Huang

[57] ABSTRACT

A modified magnifying glass with more than one clamps built on the bottom of the fixer of head magnifying glass for clamping tenons stretching out from the top of magnifying plate. A pivoting seat is set up on the top of said fixer and a revolving bracket set up on the bottom of illuminating body is pivoted at said pivoting seat. It is convenient for the users to replace magnifying plates of different magnification according to needs and magnifying glass can be turned up to vanish from user's sight while it is not in use. Besides, the angle of depression and the angle of elevation of illuminating body can be adjusted by turning the revolving bracket pivoted in the pivoting seat to allow light directly irradiates in use and practical effect are realized.

9 Claims, 6 Drawing Sheets

HEAD MAGNIFYING GLASS

BACKGROUND OF THE INVENTION

The present invention related to a head magnifying glass, and more particularly a construction of head magnifying glass, wherein magnifying plate can easily be replaced and the angle of illuminating can be adjusted in accordance with the needs of user.

With the quick development of industries in recent years, every industry gradually tends to the practical development of reducing volume and enabling all-round functions of products. Almost any industry such as precise electronic industry, precise mould manufacturing industry, seal carving industry, composing and typing industry, precise spring manufacturing industry, etc, all develop towards said direction without exception. In the manufacturing of these precise industries, workers have to use head magnifying glass to magnify work pieces for easy processing. FIGS. 1 and 2 show a conventional head magnifying glass 10, wherein a slot 201 is carved out in front of fixer 20 and a magnifying glass plate 30 is locked up with its sides seated in the sides of slot 201 to fix said magnifying plate in slot 201. Again, on the inner side of slot 201 is set up a movable plate 40 able to revolve and on said movable plate 40 a magnifying plate 401 is fixed. When said movable plate 40 is turned down, it is buttoned up by buttoning seat 202 on the inner side of slot 201. On the outer side of slot 201 of fixer 20 there is a revolving magnifying plate 50 which, while in use, can be turned down to the front of magnifying plate 30, and when it is not in use, it can be turned up to depart from the front of magnifying plate 30. Moreover, an illuminating body 60 is placed on each side of fixer 20 respectively, and when head magnifying glass is used, by utilizing the three magnifying plates 30, 401 and 50 to adjust magnification and illuminating bodies 60 as supplementary illumination, the magnification of work piece as well as the illumination onto the processing parts of work piece is realized. Although the above-mentioned object can be carried out by such construction, there are shortcomings in use yet as in the following:

1. As magnifying glass plates 30, 401 and 50 are fixed on fixer 20 in different ways, magnification is bound to be the result of the composition of the three and it is unable to replace magnifying glass place in accordance with user's needs. As a result, magnification can only be bound within certain definite magnifications, leading to the limitation of magnification;
2. Furthermore, although magnifying plates 401 and 50 can be turned up and/or down according to user's selection and compose with magnifying plate 30, when the user does not need magnifying plate, his Sight is still blocked by magnifying plate 30 and is still magnified because said magnifying plate 30 is fixed in front of the sight of user. As a result, in order to get his sight depart from the magnifying scope, the user has to take off the whole set of head magnifying glass, and it is sure that this is inconvenient for use.
3. As magnifying plate 30 is locked up at the lateral side of slot 201 of fixer 20, both of its sides will be blocked by the edges of slot 201, the range of sight is thus limited so that the 3-dimentional visual sense of object is worsened.
4. As the illumination of illuminating bodies 60 comes form both sides of fixer 20, its light can not be concentrated into a light beam illuminating upon the processing part of working piece and thus the illumination effect is lowered. Besides, since illuminating bodies 60 are fixed at both sides of fixer 20, they can not be adjusted to turn up and down and/or to the left and right so that the illuminating part may not be the required part of user, and the user can not make any adjustment for this, resulting in another difficulty in use.

SUMMARY OF THE INVENTION

The major object of the present invention is to provide a modified head magnifying glass to resolve the above-mentioned problem, wherein by utilizing the clamps set up on the bottom of fixer clamping up the tenons on the top of magnifying plate of different magnification. Again, the magnifying plate can be turned up when it is not used for easy selection of the user. Magnifying plate is suspended with clamps, its side edges appear empty without frame so that the wide visual scope is attained and the stereoscopic visual scene is improved as well The second object of the present invention is to provide a modified head magnifying glass, wherein the clamps on the fixer can clamp up two magnifying plates, one of which being in the front and the other in the rear, therefore the magnification is the composition of both of them and the adjustment of magnification at will is achieved. The other object of the present invention is to provide a modified head magnifying glass, wherein said illuminating body is pivoted at the pivoted seat of fixer by utilizing a revolving bracket made on its bottom so that the angle of depression and/or elevation can be adjusted by turning the revolving bracket. At the same time, by utilizing the pivoting connection between the illuminating body and the revolving bracket, the illuminating body can also be turned to the right or to the left to change the illuminated position of the light of illuminating body.

The object of the present invention is carried out in the following way:

A modified head magnifying glass, wherein more than one clamps are set up on the bottom of the fixer of head magnifying glass for clamping the tenons stretching out from the top of magnifying plate; a pivoting seat is established on the top of said fixer and a revolving bracket on the bottom of an illuminating body is pivoted at said pivoting seat to allow illuminating body to adjust its depression and/or elevation angle by turning the revolving bracket in the pivoting seat.

The clamps on the bottom of said fixer face each other in pairs, and the number of tenons on the top of magnifying plate matches that of clamps facing each other.

Several slide-resistant strips are attached to the surface of the revolving bracket of said illuminating body and an arc-shaped stopper is made under the bottom of the pivoting seat to allow the illuminating body to be fixed at an inclined angle by utilizing the friction between the slide-resistant strips and the arc-shaped stopper.

Said illuminating body is combined with the top of revolving bracket by means of pivoting connection so that it is able to turn to the left or to the right. The advantageous effect brought about by the above technical scheme is apparent: As said magnifying plate can be fixed on the fixer by the method of clamping, users will replace magnifying plates of different magnification according to their needs; besides, replacement is made very easy and when user does not need to use the magnifying plate, it can be turned up to depart from the user's sight by revolving the stretching tenons clamped by the clamps. Further more, said illuminating body able to adjust its depression and elevation angle is possible to adjust its illumination depression and/or elevation angle to allow light to irradiate upon the processing point directly so that various operation convenience and practical effect are realized.

Denotation of Marking Numbers:

Conventional head magnify glass part:
10-head magnifying glass
20-fixer
201-slot
202-buttoning seat
40-movable plate
30-magnifying plate
60-illuminating body
401-magnifying plate
50-magnifying plate The present invention part:
1-head magnifying glass
2-fixer
21-clamp
22-pivoting seat
221-stopper
3-magnifying plate
31-tenon
4-illuminating body
41-revolving bracket
441-slide-resistant strip

DETAILED DESCRIPTION OF THE PREFERRED EMBODIMENTS

Now the present invention will be clarified in detail by embodiments thereof shown in the attached drawings.

Figure 1:
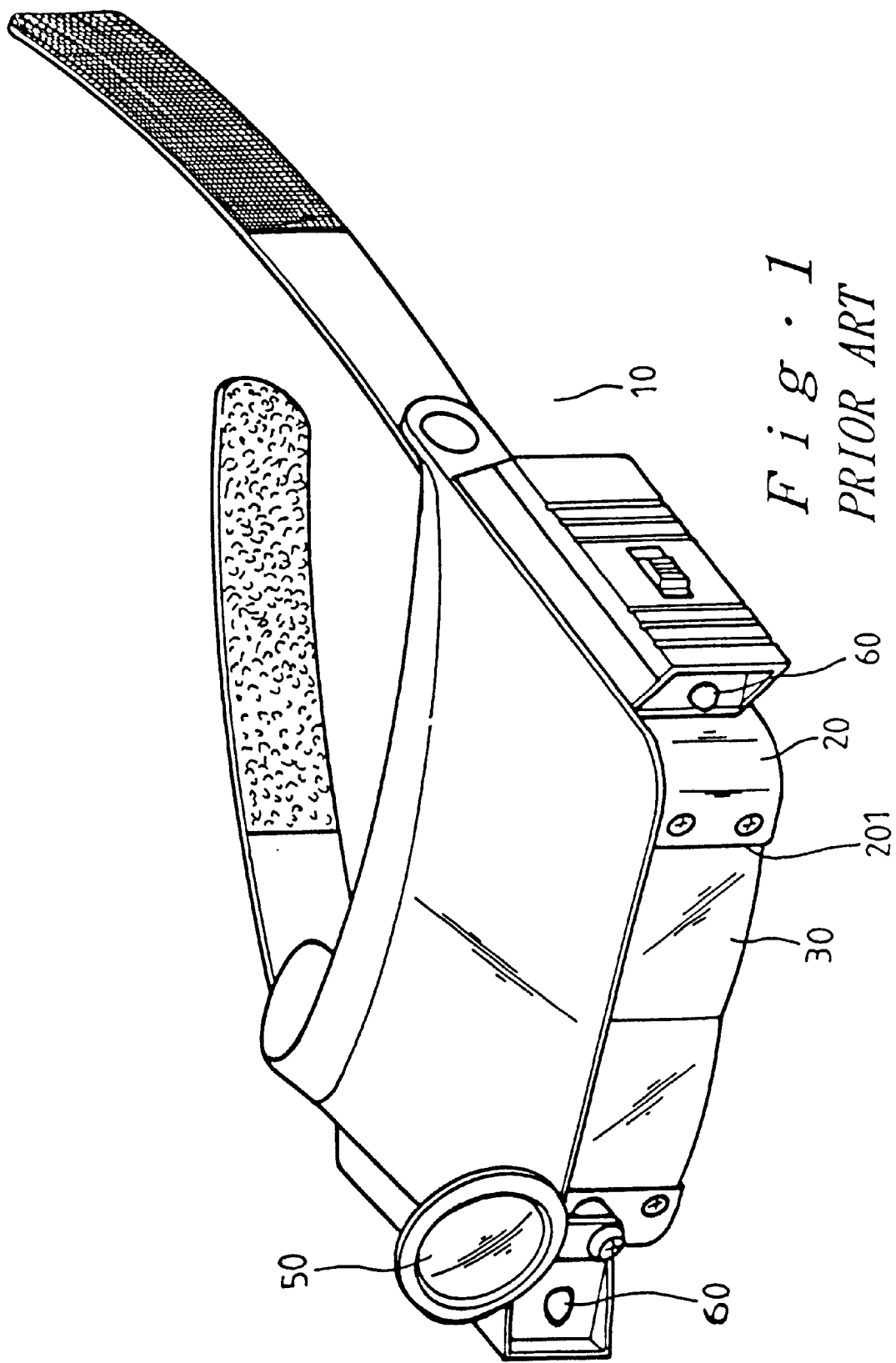
FIG. 1 is a schematic background showing the 3-dimentional view of a conventional head magnifying glass.
Figure 2:
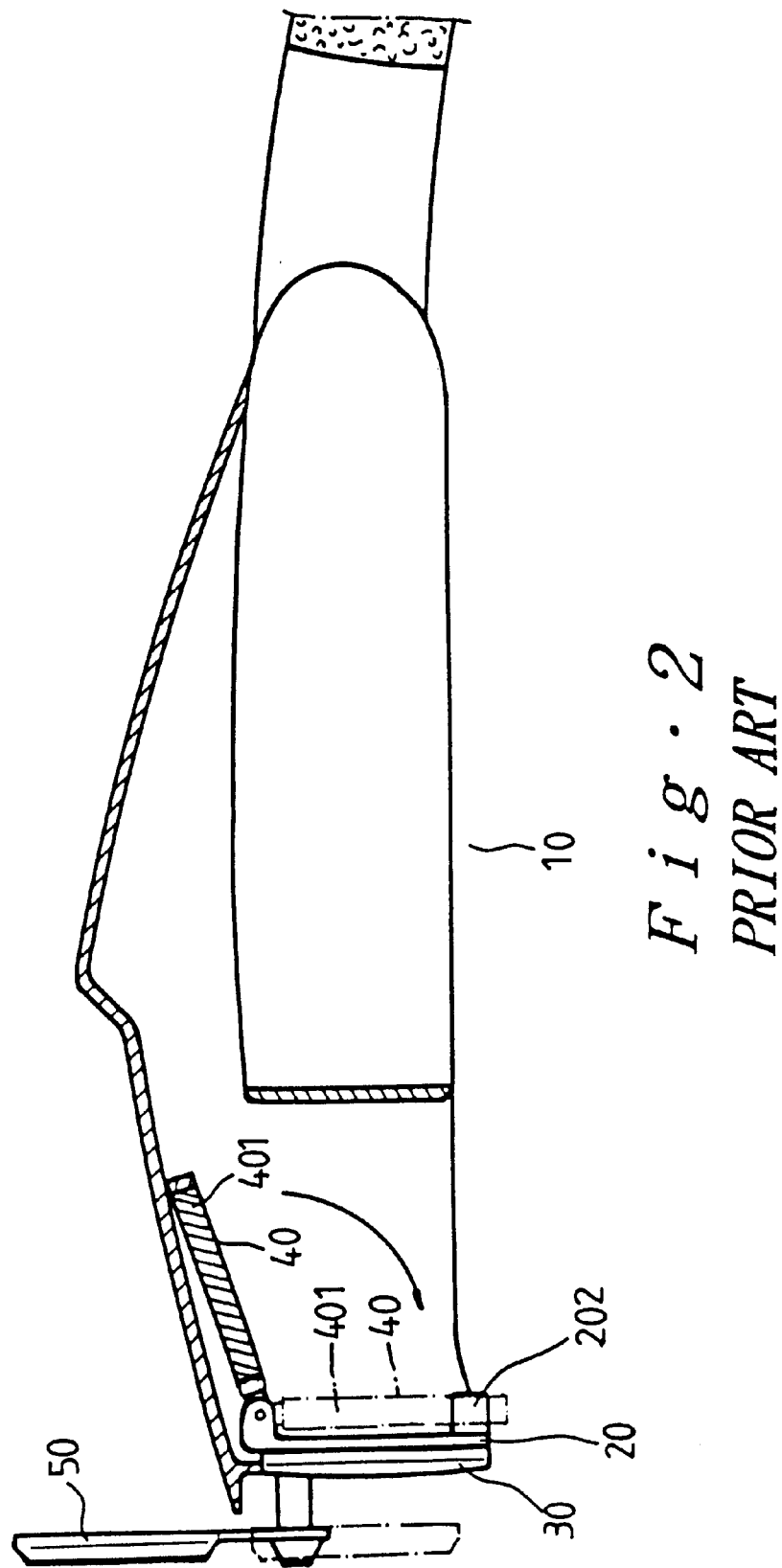
FIG. 2 is a schematic diagram of a conventional head magnifying glass.
Figure 3:
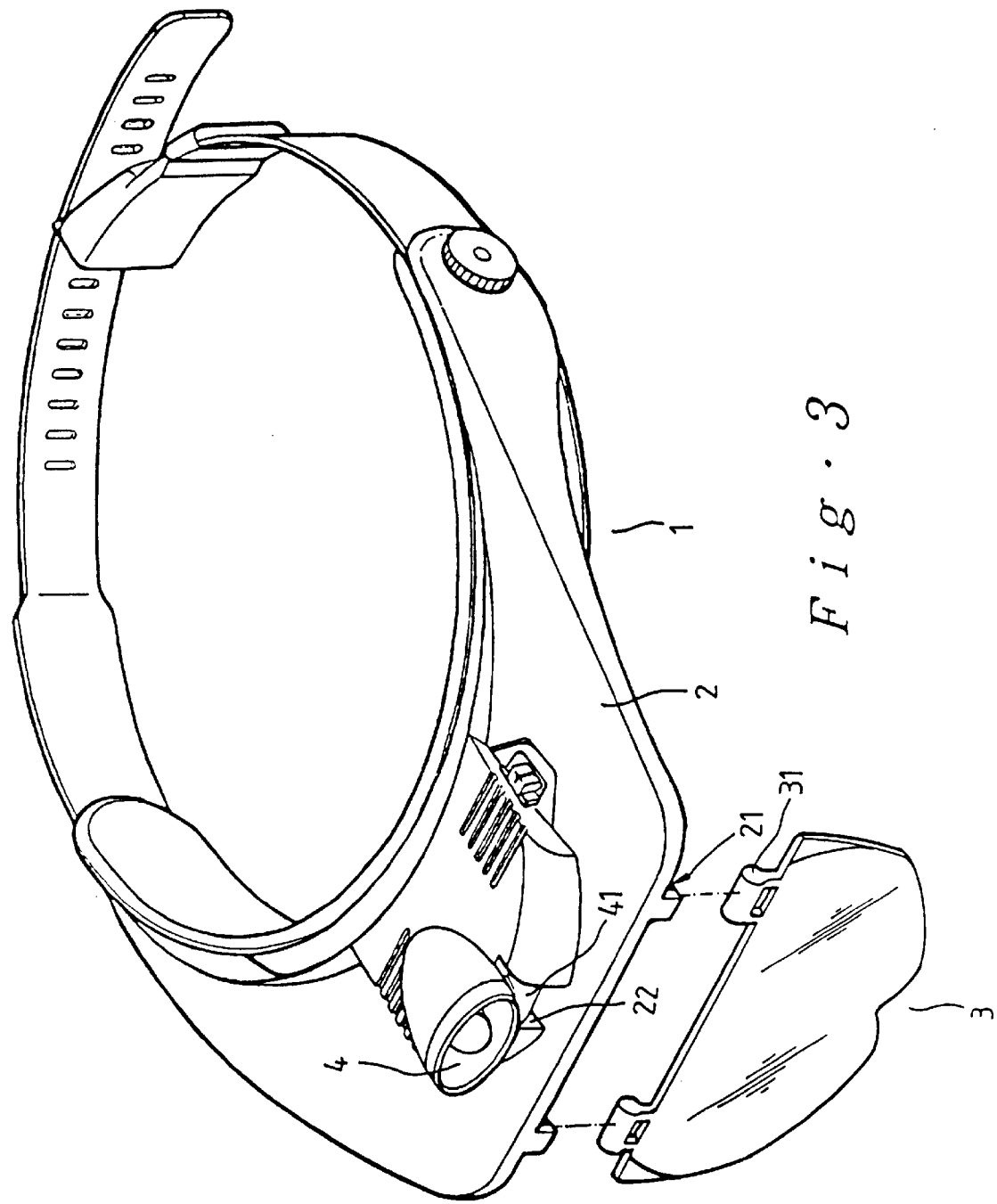
FIG. 3 is a 3-dimentional exploded diagram of the present invention.
Figure 4:
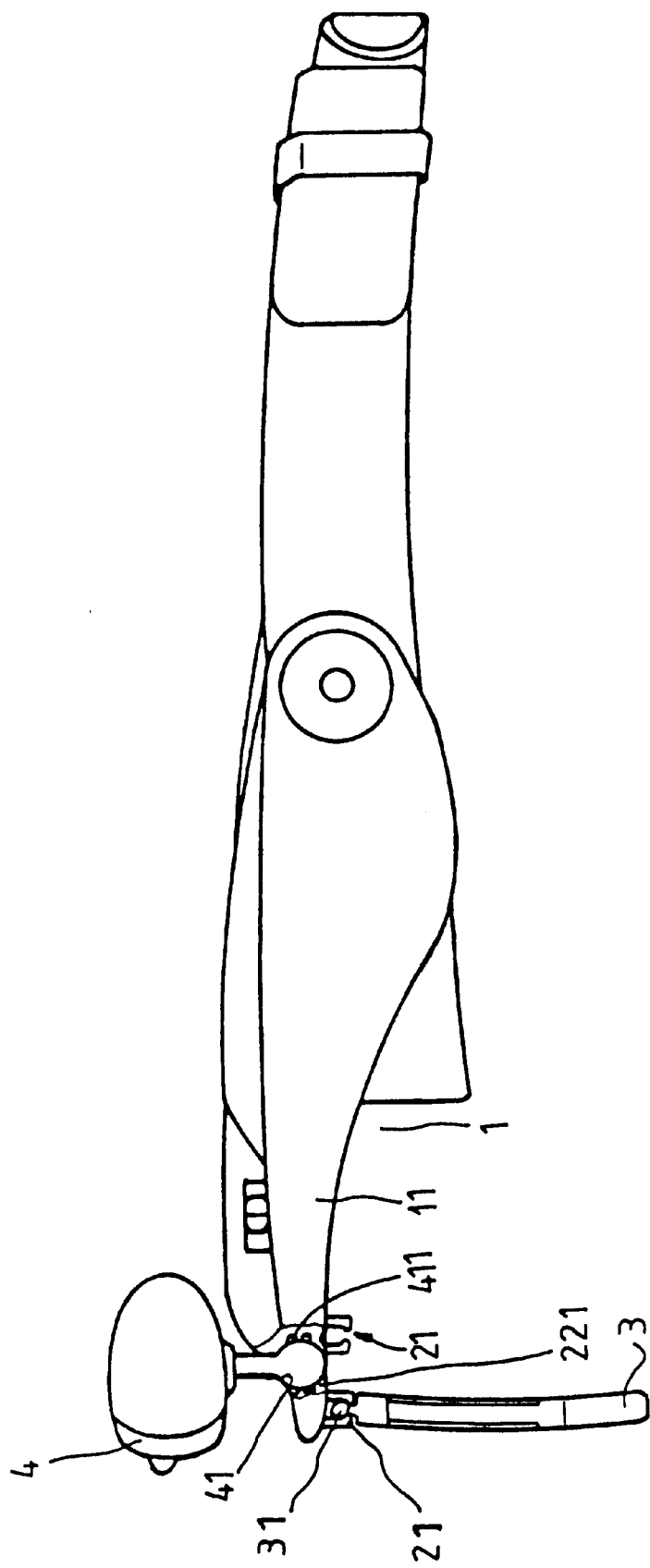
FIG. 4 is a schematic diagram showing the combination of the present invention.

In the FIGS. 3 and 4, more than one set of clamps 21 facing each other in pairs are set up under the bottom of the fixer 2 of head magnifying glass 1 to allow the tenons 31 stretching out from the top of magnifying plate 3 to be clamped in them; a pivoting seat 22 is built above the fixer 2 and said pivoting seat 22 is connected by pivoting with a revolving bracket 41 revolving in the pivoting seat 22. Besides, several slide-resistant strips 411 are attached to the surface of revolving bracket 41 beneath the bottom of illuminating body 4 and an arc-shaped stopper 211 conforming the arrangement of said slide-resistant strips 441 is built under the bottom of pivoting seat 22 to allow illuminating body 4 to stay at a certain angle by means of the friction between slide-resistant strips 441 and arc-shaped stopper 221. In the above construction, said illuminating body 4 is combined with the top of revolving bracket 41 by pivoting to enable said illuminating body 4 to turn to the left or to the right.

Figure 5:
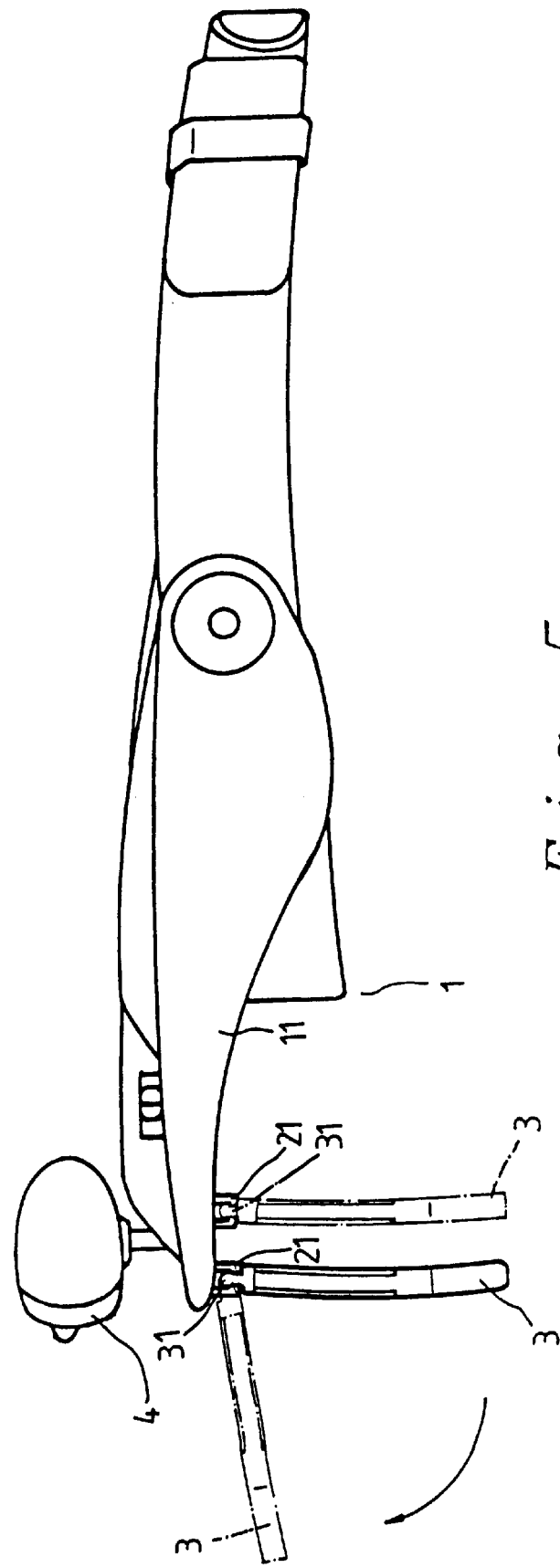
FIG. 5 is a schematic diagram showing the adjustment of magnifying plates of the present invention; and 6.

In FIG. 5 said magnifying plate 3 is clamped up in clamps 21 by its tenons 31, hence said tenons clamped up in clamps 21 will turn up simultaneously with the turning up of magnifying plate 3 so that the magnifying plate 3 will depart from user's sight while it is not in use, and thus the convenience of use for the user of whether the work piece is needed to be magnified or not is provided. Moreover, as said magnifying plate 3 is fixed by clamping tenons 31 in clamps 21, the user is able to take apart the original magnifying plate 3 and replace it with another magnifying plate 3 of different magnification, or it is also possible to put in order two magnifying plates 3 and 3', with one before the other in the corresponding positions in clamps 21 to compose the magnification of both of them so that user can adjust the magnification arbitrarily.

Figure 6:
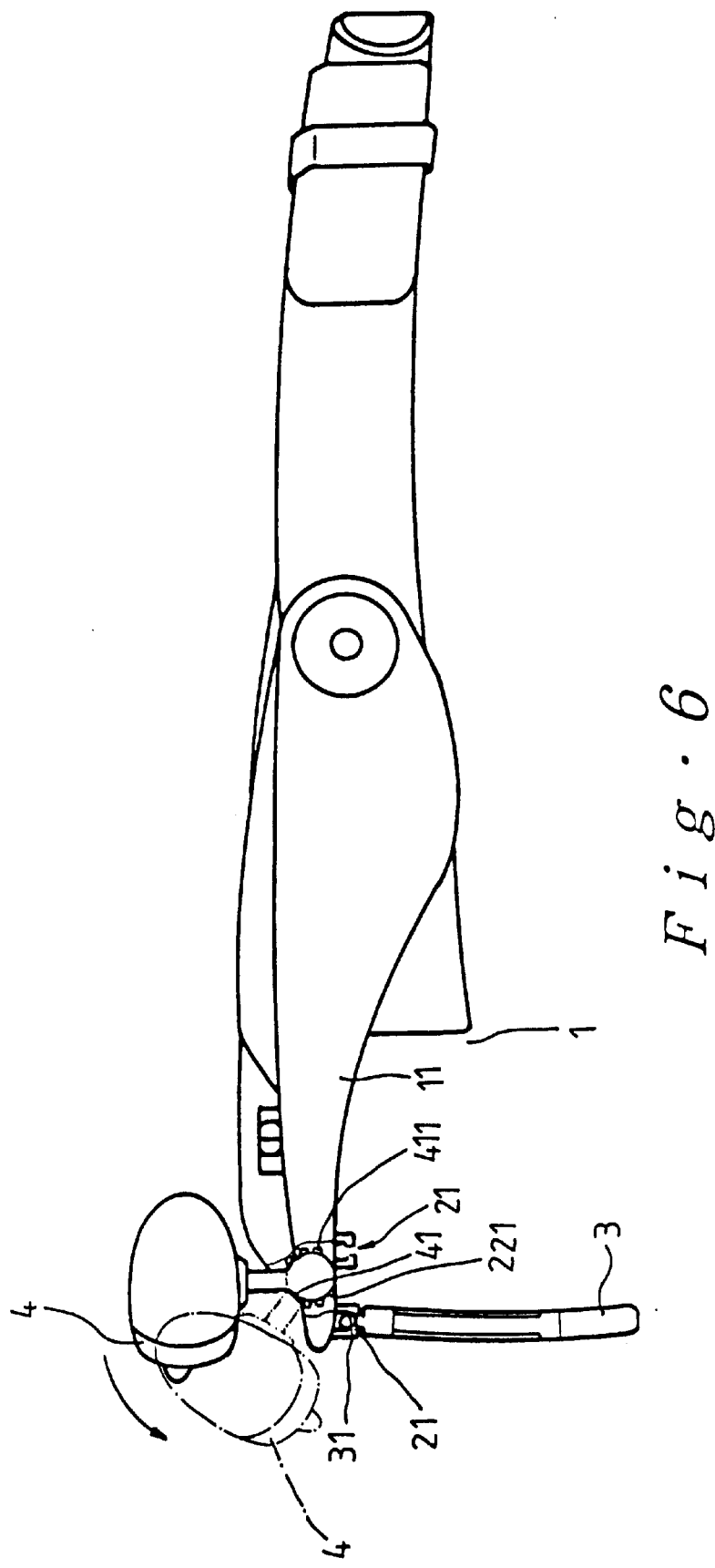
FIG. 6 is a schematic diagram showing the adjustment of the depression angle and elevation angle of illuminating body of the present invention.

In FIG. 6, in the course of processing, if the user needs auxiliary light to irradiate upon the processing article, to facilitate processing, he just needs to switch on the illuminating body, and if the distance of illumination is needed to be adjusted, he can turn the illuminating body 4 to make it rotate by utilizing revolving bracket 41 rotating in pivoting seat 22, and meanwhile, by utilizing the friction between the stopper 221 of pivoting seat 22 and the slide-resistant strips 441 of revolving bracket 41, the revolving bracket 41 can be made stay at a certain inclined angle, to change the irradiating position so as to achieve the goal of exact illumination onto the processing article.

Take the advantage of the above, the present invention creates beneficial results as follows:

1. As magnifying plate is fixed in the clamping seat by the method of clamping, when the user wants to replace the original magnifying plate with another one of different magnification, he only needs to take apart the original one so replacement is made very easy. Besides, by utilizing 2 magnifying plates placed one before the other, magnification will be the composition of that of the two, and the object of arbitrarily adjusting magnification is thus achieved.

2. Secondly, as the tenons of magnifying plate clamped the clamps can rotate, when there is no need to use the magnifying plate, the user will turn it up and it will then depart from the user's visual range, and conversely, the magnifying plate can be turned down to return to its original position.

3. Furthermore, as the magnifying plate is fixed with the tenons on its top clamped by the clamps beneath the fixer, its side edges appear to be suspending state, which allows wider visual scope of magnifying plate as well as better stereoscopic visual sense.

4. Since the revolving bracket on the bottom of said illuminating body can rotate in the pivoting seat, the angle of depression and/or elevation of illuminating body can be adjusted to change the illuminated part of working article to achieve the object of exact illumination upon the processing part of work piece.

5. In addition, as the illuminating body can also make left or right turning by utilizing the pivoting connection with the top of revolving bracket, the brightness of its light can be adjusted on the left or right side.

To sum up, the present invention possesses the above-mentioned advantages compared with conventional construction, it is thereby that the inventor applies for a patent for the present invention.

I claim:

1. A head magnifying glass comprising:
    a fixer with an upper surface and a bottom surface, the fixer having more than one clamps on the bottom surface thereof;
    a magnifying plate having tenons stretching out from top portion of the magnifying plate for engaging with the clamps so as to connect the magnifying plate to the fixer;

a pivoting seat on the upper surface of the fixer;

an illuminating body connected to the pivoting seat in such a way that the illuminating body is able to rotate around a first axis.

2. The head magnifying glass according to claim 1, wherein the first axis is substantially parallel with the upper surface of the fixer.

3. The head magnifying glass according to claim 1, wherein the clamps on the bottom surface of said fixer face each other in pairs, and the number of tenons on the top portion of the magnifying plate matches that of the corresponding clamps.

4. The head magnifying glass according claim 1, further comprising a revolving bracket having a first end and a second end, wherein the first end is pivotally connected to the pivoting seat and the second end is coupled to the illuminating body.

5. The head magnifying glass according claim 4, wherein at least one slide-resistant strip is provided on surface of the revolving bracket at the first end and an arc-shaped stopper is provided on the pivoting seat to allow the revolving bracket to fix the illuminating body at a proper position by means of friction between the slide-resistant strip and the arc-shaped stopper.

6. The head magnifying glass according to claim 4, wherein the illuminating body is pivotally connected with the second end of the revolving bracket, allowing the illuminating body to turn around a second axis.

7. The head magnifying glass according to claim 6, wherein the second axis is substantially perpendicular to the first axis.

8. A head magnifying glass comprising:

a sheet-shaped fixer having a first connecting means on a bottom surface of the sheet-shaped fixer;

a magnifying plate having a second connecting means on a top portion of the magnifying plate for engaging with the first connecting means so as to pivotally and removably connect the magnifying plate to the sheet-shaped fixer;

a third connecting means on the upper surface of the sheet-shaped fixer;

an illuminating body pivotally attached to the upper surface of the sheet-shaped fixer through the third connecting means so that the illuminating body is able to rotate around a first axis substantially parallel with the upper surface of the sheet-shaped fixer.

9. The head magnifying glass according to claim 8, wherein the illuminating body is structured so as to be able to rotate around a second axis substantially perpendicular to the first axis.

* * * * *